(12) United States Patent
Tanaka

(10) Patent No.: US 6,999,401 B2
(45) Date of Patent: Feb. 14, 2006

(54) PICKUP DEVICE FOR OPTICAL DISC AND OBJECTIVE LENS PROTECTIVE MEMBER

(75) Inventor: Mitsuru Tanaka, Mie (JP)

(73) Assignee: NTN Corporation, Osaka (JP)

( * ) Notice: Subject to any disclaimer, the term of this patent is extended or adjusted under 35 U.S.C. 154(b) by 425 days.

(21) Appl. No.: 10/386,428

(22) Filed: Mar. 13, 2003

(65) Prior Publication Data

US 2003/0174634 A1 Sep. 18, 2003

(30) Foreign Application Priority Data

Mar. 15, 2002 (JP) ........................ 2002-072565

(51) Int. Cl.
G11B 7/00 (2006.01)

(52) U.S. Cl. ................................. 369/112.23
(58) Field of Classification Search ............ 369/112.23, 369/44.14, 44.22, 112.01, 75.1, 75.2, 77.1, 369/77.2, 244, 247; 359/871
See application file for complete search history.

(56) References Cited

U.S. PATENT DOCUMENTS 6,781,946 B2 * 8/2004 Murata et al. ......... 369/112.23

FOREIGN PATENT DOCUMENTS

| JP | 2-054433 | 2/1990 |
| JP | 11-312322 | 11/1999 |
| JP | 2001-297478 | 10/2001 |

* cited by examiner

Primary Examiner—Nabil Hindi
(74) Attorney, Agent, or Firm—Wenderoth, Lind & Ponack, L.L.P.

(57) ABSTRACT

A protective member is proposed which can reliably prevent damage to an optical disc and which can be easily mounted to an objective lens retaining portion of a pickup device. The objective lens protective member protrudes from the objective lens toward the optical disc. It has a resin film and a resin coating layer formed on the resin film by baking resin powder dispersed in an organic solvent, and an adhesive layer formed on the back thereof beforehand. Thus it is possible to reliably prevent damage to the optical disc and to easily provide the protective member on a retaining portion for the objective lens by bonding.

3 Claims, 1 Drawing Sheet

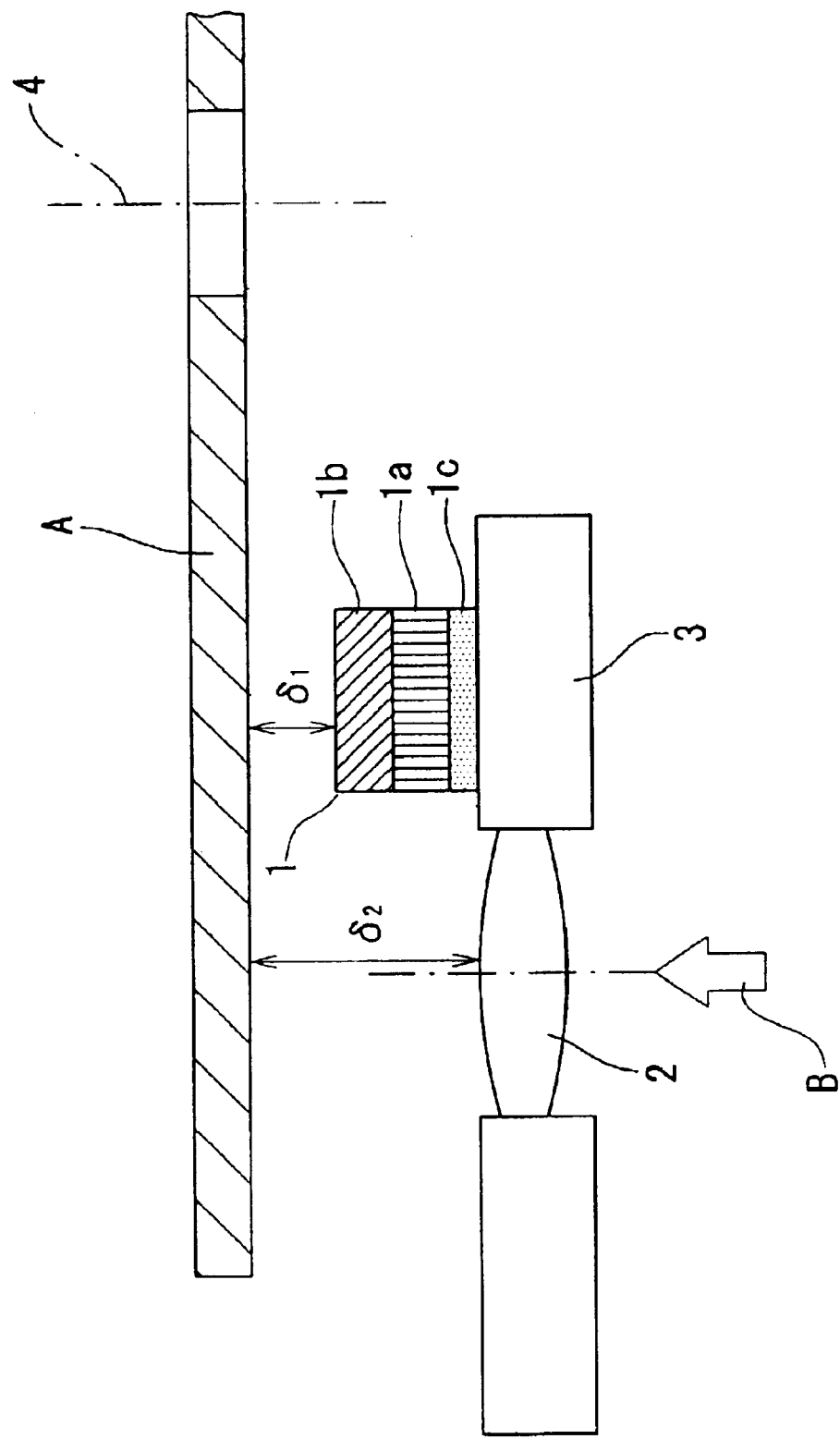

PICKUP DEVICE FOR OPTICAL DISC AND OBJECTIVE LENS PROTECTIVE MEMBER

BACKGROUND OF THE INVENTION

This invention relates to a pickup device for an optical disc and an objective lens protective member used therefor.

A pickup device for an optical disc replay device in which an optical disc such as a CD (compact disc) or DVD (digital versatile disc) is inserted in an exposed state has an objective lens for focusing a laser beam on the information recording surface of the optical disc, with the objective lens arranged at a small distance of about 2 mm from the optical disc. The distance between the optical disc and the objective lens is expected to further decrease as the information recording density of optical discs increases. The objective lens is adapted to be moved in a direction normal to the optical disc surface and in a radial direction of the optical disc together with its retaining portion for focus adjustment of the laser beam and tracking adjustment.

Thus, in such a pickup device, the objective lens and the optical disc, which are arranged close to each other, may contact each other by vibration or shock, thus damaging the information recording surface of the optical disc or the objective lens. In order to prevent them from contacting each other, a soft objective lens protective member is provided so as to protrude from the objective lens toward the optical disc.

As such an objective lens protective member, there are known one in which a shock-absorbing material such as wool felt is fitted (JP patent publication 2593998), one in which a protrusion is provided which is formed of a plastic softer than the optical disc (JP patent publication 2-54433), one in which a protector made of silicon rubber is fitted (JP patent publication 11-312322), and one in which a protective lubricating layer is formed on the surface of a resilient metallic plate having a convex surface (JP patent publication 2001-297478).

Such an objective lens protective member has to be not only softer than the material of the optical disc so that it will not damage the information recording surface of the optical disc, but also it has to be elastic to lessen impact of contact with the optical disc, and has to be superior in lubricity so that the friction with the optical disc, which is rotating at a high speed, is low. Further, it is preferably easily mountable on the objective lens retaining portion of a compact pickup device.

Of these four conventional protective members, the first three are relatively easily mountable. But none of them has both resilience and lubricity. On the other hand, the fourth protective member has both resilience and lubricity. But since a resilient metallic plate is formed by insert molding so as to protrude from the objective lens retaining portion and a protective lubricative layer of amorphous carbon film is formed by e.g. ion plating, it is extremely troublesome to manufacture it.

An object of this invention is to make it possible to easily provide an objective lens protective member which can reliably prevent damage to the optical disc on the objective lens retaining portion.

SUMMARY OF THE INVENTION

According to this invention, there is provided a pickup device for an optical disc comprising an objective lens protective member, the protective member being provided on a retaining portion for an objective lens of the pickup device for focusing a laser beam on an information recording surface of the optical disc so as to protrude from the objective lens toward the optical disc to prevent contact of the objective lens with the optical disc, characterized in that the objective lens protective member has a resin film and a resin coating layer formed on the surface of the resin film, the resin coating layer is formed by baking or drying a resin component dispersed or dissolved in an organic solvent, and the resin coating layer is bonded to the retaining portion.

That is, the objective lens protective member is a resin film which is high in elasticity, and on the surface of the resin film, a resin coating layer formed by baking or drying a resin component dispersed or dissolved in an organic solvent is formed. The resin coating layer is softer than the material of the optical disc and has superior lubricity. Thus, even if the protective member hits the optical disc, it is possible to reliably prevent damage to the optical disc. Also, by bonding the protective member to the objective lens retaining portion, the objective lens protective member can be easily mounted.

The material for the resin film will be appropriate only if it has resistance to an organic solvent used in forming the resin coating layer and has adhesiveness to the objective lens retaining portion. For example, various engineering plastics such as polyetherether ketone, liquid crystal polymer, polyimide, polyether sulfone, polyether imide, polyethylene terephthalate and polybutylene terephthalate can be used.

Also, the resin component forming the resin coating layer may be fluorine resin or urethane resin so that the resin coating layers have elasticity.

According to this invention, there is provided a objective lens protective member for a pickup device for an optical disc, the protective member being bonded to a retaining portion for an objective lens of the pickup device for focusing a laser beam on an information recording surface of the optical disc so as to protrude from the objective lens toward the optical disc to prevent contact of the objective lens with the optical disc, characterized in that the objective lens protective member has a resin film and a resin coating layer formed on the surface of the resin film, and the resin coating layer is formed by baking or drying a resin component dispersed or dissolved in an organic solvent.

By forming an adhesive layer on the back of the resin film formed with the resin coating layer, it is possible to eliminate the necessity of applying an adhesive when providing the objective lens protective member on the objective lens retaining portion. Thus production becomes easier.

BRIEF DESCRIPTION OF THE DRAWINGS

Other features and objects of the present invention will become apparent from the following description made with reference to the accompanying drawings, in which:

FIG. 1 is a schematic front view showing a pickup device for optical discs provided with the objective lens protective member according to the present invention.

DETAILED DESCRIPTION OF THE PREFERRED EMBODIMENT

Hereinbelow, the embodiment of this invention will be described with reference to the drawing. FIG. 1 shows a pickup device for optical discs having an objective lens protective member 1 according to this invention. This pickup device includes an objective lens protective member 1 bonded to a retaining portion 3 for an objective lens 2 for focusing a laser beam B on the information recording surface of an optical disc A so as to protrude toward the optical disc A from the objective lens 2. The distance δ 1 between the optical disc A and the protective member 1 is set at 0.8 mm and the distance δ 2 between the optical disc A and the objective lens 2 is set at 2.0 mm.

The optical disc A is adapted to be rotated about a spindle 4 at high speed. The retaining portion 3 is adapted to be moved in a direction perpendicular to the information recording surface of the optical disc A and in a radial direction of the optical disc A by a linear drive device (not shown).

The objective lens protective member 1 has a resin coating layer 1*b* formed on the front side of a resin film 1*a* of polyetherether ketone and an adhesive layer 1*c* formed beforehand on the back thereof. The resin coating layer 1*b* is formed by baking resin powder containing fluorine resin as the major component and dispersed in an organic solvent. Thus, the protective member 1 can be easily bonded to the retaining portion 3 without applying an adhesive.

In this embodiment, polyetherether ketone is used for the resin film of the objective lens protective member. But for the resin film, only resistance to organic solvents and adhesiveness to the objective lens retaining portion are required. Thus, it is possible to use various kinds of engineering plastics. Also, the resin coating film layer may be formed by dissolving a resin component (fluorine resin or urethane resin) into an organic solvent and drying it.

As described above, in the pickup device for optical discs according to this invention, the objective lens protective member is an elastic resin film, and on the surface of the resin film, a resin coating film layer is formed which is softer than the optical disc material, and has excellent lubricity and which is formed by baking or drying a resin component dispersed or dissolved in an organic solvent, and the protective member is bonded on the objective lens retaining portion with an adhesive. Thus, even if the protective member hits the optical disc, it will not damage the optical disc. Because the protective member can be bonded to the retaining portion of the objective lens, it is possible to easily provide the objective lens protective member.

Also, with the objective lens protective member of this invention, since a resin coating layer is formed on the resin film and an adhesive layer is formed on the back thereof beforehand, it is possible to easily bond it to the objective lens retaining portion without applying a separate adhesive.

What is claimed is:

1. A pickup device for an optical disc comprising an objective lens protective member, said protective member being provided on a retaining portion for an objective lens of the pickup device for focusing a laser beam on an information recording surface of the optical disc so as to protrude from the objective lens toward the optical disc to prevent contact of the objective lens with the optical disc, characterized in that said objective lens protective member has a resin film and a resin coating layer formed on the surface of said resin film, said resin coating layer is formed by baking or drying a resin component dispersed or dissolved in an organic solvent, and said resin coating layer is bonded to said retaining portion.

2. An objective lens protective member for a pickup device for an optical disc, said protective member being bonded to a retaining portion for an objective lens of the pickup device for focusing a laser beam on an information recording surface of the optical disc so as to protrude from the objective lens toward the optical disc to prevent contact of the objective lens with the optical disc, characterized in that said objective lens protective member has a resin film and a resin coating layer formed on the surface of said resin film, and said resin coating layer is formed by baking or drying a resin component dispersed or dissolved in an organic solvent.

3. An objective lens protective member as claimed in claim 2 wherein an adhesive layer is formed on the side of said resin file opposite said resin coating layer.

* * * * *